United States Patent [19]

Hamprecht

[11] 4,452,609
[45] Jun. 5, 1984

[54] DYEING RED WITH 2,6-DICYANO-2'-SULFONAMIDO-4'-AMINO-AZO-BENZENES

[75] Inventor: Rainer Hamprecht, Cologne, Fed. Rep. of Germany

[73] Assignee: Bayer Aktiengesellschaft, Leverkusen, Fed. Rep. of Germany

[21] Appl. No.: 449,310

[22] Filed: Dec. 13, 1982

Related U.S. Application Data

[60] Division of Ser. No. 112,995, Jan. 17, 1980, abandoned, which is a continuation of Ser. No. 110,731, Jan. 9, 1980, abandoned, which is a continuation of Ser. No. 884,954, Mar. 9, 1978, abandoned.

[30] Foreign Application Priority Data

Mar. 15, 1977 [DE] Fed. Rep. of Germany ....... 2711130
Sep. 3, 1977 [DE] Fed. Rep. of Germany ....... 2739842

[51] Int. Cl.³ .................. C07C 161/06; D06P 1/02
[52] U.S. Cl. ........................................ 8/694; 8/662; 8/922; 260/207.1; 260/207.3
[58] Field of Search .................... 8/662, 694

[56] References Cited

U.S. PATENT DOCUMENTS 2,955,901 10/1960 Kruckenberg ............. 8/662
3,962,209 6/1976 Gotteschlich et al. ........... 260/152
4,083,846 4/1978 Leverenz ................ 260/207.1
4,115,381 9/1978 Ramanathan ............. 260/207.1

FOREIGN PATENT DOCUMENTS 2938633 4/1981 Fed. Rep. of Germany .

Primary Examiner—A. Lionel Clingman
Attorney, Agent, or Firm—Sprung, Horn, Kramer & Woods

[57] ABSTRACT

Azo compounds of the formula

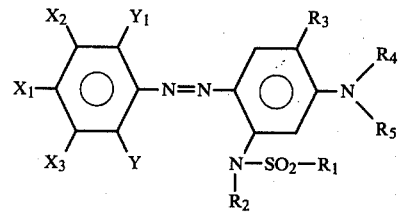

wherein
$R_1$ is alkyl, alkenyl, aralkyl, aryl or hetaryl,
$R_2$ is hydrogen or alkyl,
$R_3$ is hydrogen, alkyl, halogen, $OR_1$ etc.
$R_4$ is hydrogen, alkyl, aralkyl, aryl or cycloalkyl,
$R_5$ is hydrogen, alkyl, alkenyl or aralkyl,
Y is cyano, halogen, trifluoromethyl, nitro or $SO_2R_1$,
$Y_1$ is halogen or preferably cyano,
$X_1$ is hydrogen or a substituent with a Hammet $\sigma$ para value of $-0.3$ to $+0.3$,
$X_2$ is hydrogen, halogen etc., are useful for dyeing polyester fibre materials in clear red to violet shades with good general fastness properties.

5 Claims, No Drawings

DYEING RED WITH 2,6-DICYANO-2'-SULFONAMIDO-4'-AMINO-AZO-BENZENES

This is a division of application Ser. No. 112,995, filed Jan. 17, 1980, now abandoned; which is a continuation of Ser. No. 110,731, filed Jan. 9, 1980, now abandoned; which is a continuation of Ser. No. 884,954, filed Mar. 9, 1978, now abandoned.

The invention relates to azo compounds of the formula

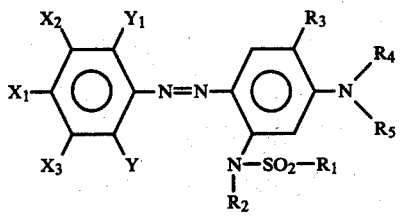

wherein
$R_1$ is alkyl, alkenyl, aralkyl, aryl or hetaryl,
$R_2$ is hydrogen or alkyl,
$R_3$ is hydrogen, alkyl, halogen, cyano, $OR_1$ or $COOR_1$,
$R_4$ is hydrogen, alkyl, aralkyl, aryl or cycloalkyl, $R_5$ is hydrogen, alkyl, alkenyl or aralkyl,
Y is cyano, halogen, trifluoromethyl, nitro or $SO_2R_1$,
$Y_1$ is halogen or cyano,
$X_1$ is hydrogen or a substituent with a Hammet $\sigma$ para value of $-0.3$ to $+0.3$,
$X_2$ is hydrogen, halogen, $OR_1$, $COOR_1$, COOH, $NR_2CHO$, $CF_3$, $NR_2COR_1$, $N(COR_1)_2$,

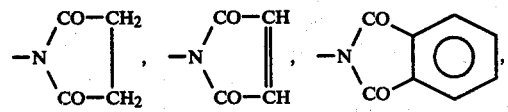

$NR_2SO_2R_1$ or $NR_2SO_2N(R_2)_2$
$X_3$ is alkyl or $X_2$ and
$X_1$ with $X_2$ or $X_3$ is the grouping $-OCH_2OCH_2-$ and
$R_3$ and $R_4$, as well as $R_4$ and $R_5$, can be linked by an alkylene chain, the abovementioned alkyl, aralkyl, alkenyl, aryl and heteryl radicals being optionally substituted by non-ionic substituents or COOH.

Suitable substituents $X_1$ with a Hammet $\sigma$ para value of $-0.3$ to $+0.3$ are those such as are listed in H. A. Staab "Einführung in die theoretische organische Chemie" ("Introduction to Theoretical Organic Chemistry"), Verlag Chemie, Weinheim/Bergstrasse 1970, or are the weakly electron-donating or weakly electron-attracting, preferably non-ionic substituents customary in dyestuff chemistry, and hydrogen. Examples which may be mentioned are: alkyl, aryl, aralkyl, O-alkyl, O-aryl, O-aralkyl, halogen, $-NR_2COR_1$, $-N(COR_1)_2$, $-NR_2CHO$,

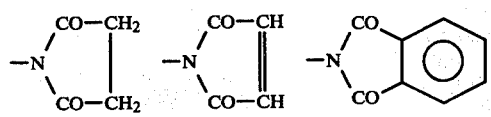

-continued $$R_1OCO-, \quad R_1CO-, \quad R_1NHCO-$$
$$\underset{O}{\|} \qquad \underset{O}{\|} \qquad \underset{O}{\|}$$

and $-NR_2SO_2R_1$.

The alkylene chains which can link $R_3$ and $R_4$ or $R_4$ and $R_5$ preferably contain 3 to 5 C atoms.

Preferred compounds are those of the formula I, wherein
$X_1$ denotes hydrogen, alkyl, $-O$-alkyl, alkyl-$(OCH_2CH_2)_mO-$ (in which $m=1-4$), aralkyl, aryl, halogen, $-O$-aryl, $-NR_2CHO$, $-NR_2COR_1$ or $NR_2SO_2R_1$,
$X_2$ denotes hydrogen, $-O$-alkyl, $CF_3$ or NHCO-alkyl,
$X_3$ denotes alkyl or $X_2$ or
$X_1$ with $X_2$ or $X_3$ denotes the grouping $-OCH_2OCH_2-$,
Y denotes cyano, chlorine, bromine, iodine or $-SO_2-$alkyl,
$Y_1$ denotes chlorine, bromine, iodine or cyano,
$R_1$ denotes alkyl, alkenyl, aralkyl, aryl or hetaryl,
$R_2$ denotes hydrogen,
$R_3$ denotes hydrogen, alkyl, O-alkyl or chlorine,
$R_4$ denotes hydrogen, aralkyl, alkyl or cycloalkyl and
$R_5$ denotes alkenyl or $R_4$,
wherein the alkyl radicals mentioned in any desired connection above preferably contain 1–4 C atoms and can preferably be monosubstituted by halogen, $-CN$, $-OH$, $$R_1CO-, \quad COOH, \quad -COR_1, \quad R_1O-, \quad R_1OCO-, \quad R_1NHCO-$$
$$\underset{O}{\|} \qquad \qquad \underset{O}{\|} \qquad \qquad \underset{O}{\|} \qquad \underset{O}{\|}$$

or aryl, or a group $(-OCH_2CH_2)_nOR_1$ ($n=1-8$), the alkenyl radicals preferably contain 3–5 C atoms and can be optionally substituted by halogen, the aralkyl radicals are preferably benzyl and phenylethyl radicals, which can preferably be monosubstituted to trisubstituted by alkyl, O-alkyl, halogen and nitro, the aryl radicals are preferably phenyl radicals, which can preferably be monosubstituted to trisubstituted by alkyl, O-alkyl, halogen, $-CN$, $NO_2$ or $-COO-(C_1-C_4$-alkyl), the hetaryl radicals are preferably pyridine, quinoline or thiophene radicals, and halogen is preferably to be understood as bromine or chlorine.

Preferred alkyl radicals are methyl, ethyl, n-propyl and n-butyl. A preferred aryl radicals is phenyl, and "bulky" radicals (for example t-butyl) are preferably in those positions where they cause no steric hindrance (for example in the m-position or, preferably, p-position of a phenyl radical).

Cycloalkyl is preferably cyclohexyl.

Preferred compounds in the scope of the compounds of the formula (I) are especially those which are water-insoluble and in which
$X_1$ represents hydrogen, alkyl or O-alkyl,
$X_2$ represents hydrogen,
$X_3$ represents hydrogen, alkyl or =O-alkyl,
$R_1$ represents alkyl, aryl or aralkyl,
$R_2$ represents hydrogen,
$R_3$ represents hydrogen, alkyl or =O-alkyl,
$R_4$ represents hydrogen, alkyl or aralkyl,
$R_5$ represents alkyl or aralkyl,
$Y_1$ represents chlorine, bromine, iodine or cyano and Y represents —SO$_2$-alkyl or, preferably, chlorine or bromine or iodine or, in particular, cyano, "alkyl", "aralkyl" and "aryl" having the abovementioned meaning.

Those compounds of the formula (I) wherein

X$_2$, R$_2$ and R$_3$ denote hydrogen,

X$_3$ denotes C$_1$-C$_4$-alkyl or, preferably, hydrogen,

X$_1$ denotes C$_1$-C$_4$-alkyl, C$_1$-C$_4$-alkoxy or CH$_3$(OCH$_2$CH$_2$)$_m$O—, Y and Y$_1$ denote cyano, R$_1$ denotes C$_1$-C$_4$-alkyl, R$_4$ denotes hydrogen or C$_1$-C$_4$-alkyl, which can be substituted by C$_1$-C$_4$-alkoxy and R$_5$ denotes benzyl, phenethyl or C$_1$-C$_4$-alkyl, which can be substituted by C$_1$-C$_4$-alkoxy, are particularly preferred.

The new azo compounds of the formula (I) are prepared in a manner which is in itself known, for example by coupling diazotised anilines of the formula (II)

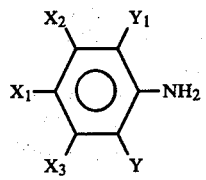

to coupling components of the formula (III)

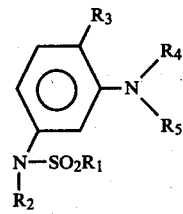

wherein

X$_1$-X$_3$, Y, Y$_1$ and R$_1$-R$_5$ have the meaning described above.

Those compounds of the formula I wherein Y$_1$=CN are preferably prepared by a process in which diazotised anilines of the formula (IV)

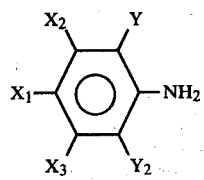

wherein

X$_1$-X$_3$ and Y have the meaning described above and

Y$_2$ denotes chlorine, bromine or iodine, are combined with coupling components of the formula (III) to give the corresponding o-halogenoazo dyestuffs (V)

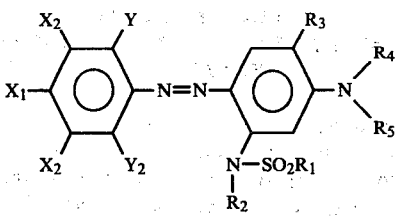

and the halogen substituent or substituents Y$_2$ and/or Y in these compounds are replaced by a cyano, nitro or SO$_2$—R substituent. Y$_2$ preferably represents bromine.

These replacement reactions are also known and are described, for example, in the following Patent literature: DT-OS (German Published Specification) No. 1,544,563=British Patent Specification No. 1,125,638, DT-OS (German Published Specification) Nos. 2,341,109 and 2,456,495, DT-OS (German Published Specification) No. 1,809,921=British Patent Specification No. 1,255,367, and British Patent Specification No. 1,226,950.

The halogen/cyano exchange is preferably carried out by means of copper-I cyanide, zinc cyanide or mixtures of these cyanides.

Examples of suitable diazo components of the formula (II) or (IV) are: 2,6-dichloroaniline, 2,4,6-trichloroaniline, 2,4,6-tribromoaniline, 2,6-dibromo-4-methyl-aniline, 2,6-dibromo-3,4-dimethyl-aniline, 2,6-dibromo-4-dodecylaniline, 2,6-dibromo-4-cyclohexylaniline, 2,6-dibromo-4-ethylaniline, 2,6-dichloro-4-methoxy-aniline, 2,6-dibromo-3-methoxy-4-methyl-aniline, 2,6-dibromo-3-acetamino-4-methyl-aniline, 2,6-dibromo-4-($\beta$-hydroxy-acetyl)-amino-aniline, 2,6-dibromo-4-tert.-butyl-aniline, 2-nitro-4-methyl-6-bromo-aniline, 2-nitro-4-methoxy-6-bromo-aniline, 2-cyano-4,6-dibromo-aniline, 4-dodecylaminocarbonyloxy-2,6-dibromo-aniline and 4-phenylaminocarbonyloxy-2,6-dibromo-aniline.

Examples of suitable coupling components of the formula (III) are: 3-diethylamino-methanesulphonanilide, 3-dipropylamino-methanesulphonanilide, 3-dibutylamino-methylsulphonanilide, 3-diethylamino-benzenesulphonanilide, 3-diethylamino-p-toluenesulphonanilide, 3-dibutylamino-p-toluenesulphonanilide, 3-dioctylamino-methanesulphonanilide, 3-dipropylamino-$\omega$-chlorobutanesulphonanilide, 3-diallylamino-methanesulphonanilide, 3-di-($\beta$-propoxyethyl)-amino-methanesulphonanilide, 3-di($\beta$-butoxyethyl)-amino-benzenesulphonanilide, 3-di($\beta$-ethoxyethyl)-amino-toluenesulphonanilide, 2-(ethyl-$\beta$-cyanoethyl)-amino-4-methanesulphonamido-anisole, 3-ethylbenzyl-amino-methylsulphonanilide, 3-phenylamino-methylsulphonanilide, 3-diethylamino-benzylsulphonanilide and 3-diethylamino-dodecylsulphonanilide.

The compounds according to the invention, in particular those in which Y$_1$=CN, are valuable dyestuffs which can be used for dyeing synthetic textile materials, in particular textile materials consisting of secondary cellulose acetate and cellulose triacetate, polyamide, such as, for example, polyhexamethyleneadipamide, and especially an aromatic polyester, such as, for example, polyethylene terephthalate, by dyeing methods customary for these types of fibres, aqueous or nonaqueous liquors being employed.

In addition, the new dyestuffs can also be used for spin dyeing and melt dyeing polyamides, polyesters, polyurethanes and polyolefins. Furthermore, the dyestuffs are suitable for dyeing hydrocarbons, such as, for example, heating oil.

Finally, the dyestuffs can be applied to synthetic textile materials by transfer printing.

The resulting red to violet dyeings have good general fastness properties and good depth of colour and are distinguished by a particularly clear contour shade, such as has hitherto only been obtained from anthraquinone dyestuffs, but at the cost of a low depth of colour.

A particularly good affinity can be achieved here by mixing the dyestuffs of the formula (I). The mixtures can be prepared not only from the finished dyestuffs, but also by coupling a diazo component to a mixture of the coupling components or by subjecting the o-halogenoazo dyestuffs of the formula (V) together, as a mixture, to a nucleophilic replacement reaction with cyanide, nitrite or sulphinates.

EXAMPLE 1

Preparation of the dyestuffs of the formula

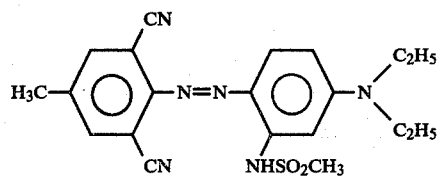

A solution of 26.5 g of 2,6-dibromo-4-methyl-aniline in 125 ml of 60% strength sulphuric acid is diazotised with 17 ml of a 42% strength nitrosylsulphuric acid at 38°–40° C. The mixture is subsequently stirred for 60 minutes at 40° C., and the solution of the diazo component is then added, at 0°–5° C., to a solution or suspension of 24.2 g of 3-diethylamino-methanesulphonanilide and 2 g of amidosulphonic acid in 200 ml of water. The pH value is increased to 3 by adding sodium acetate.

The precipitate is filtered off and washed several times with water.

Yield: 45.5 g 10.36 g of the 3-methanesulphonamido-4-(2',6'-dibromo-4'-methyl-phenylazo)-N,N-diethylaniline thus obtained are dissolved or suspended in 50 ml of dimethylformamide, together with 2.35 g of zinc cyanide and 0.2 g of copper cyanide, and the mixture is warmed to 100° C. for 30 minutes. The product is precipitated with 50 ml of water and 7.5 g of the dicyanoazo dyestuff are filtered off. It dyes polyester fibres in a bluish-tinged red shade with good fastness properties, in particular fastness to light, sublimation and wet processing.

EXAMPLE 2

Preparation of the dyestuff of the formula

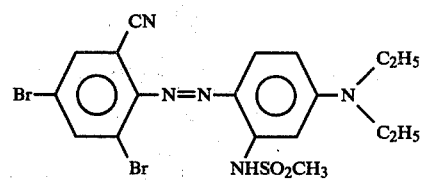

12 ml of 42% strength nitrosylsulphuric acid are added dropwise to a suspension of 20 g of 2,4-dibromo-6-cyanoaniline in 90 ml of 60% strength sulphuric acid at 38°–40° C. in the course of 30 minutes. The mixture is stirred for a further 1 hour at 38°–40° C., and the resulting diazonium salt solution is then added, at 0°–5° C., to a solution of 21.2 g of 3-methanesulphonamido-N,N-diethylaniline hydrochloride in 100 ml of water and 20 ml of 10% strength amidosulphonic acid solution. The pH value is increased to 4 by adding sodium acetate. The product is filtered off, washed several times with water and dried.

Yield: 35.8 g. The dyestuff dyes polyester in a bluish-tinged red shade with good fastness properties.

The dyestuffs indicated in the Table which follows are obtained by an analogous or similar procedure.

| Example No. | Formula | Colour shade on polyester |
|---|---|---|
| 3 | ![structure with CH3, CN, CN, N=N, N(C3H7)2*, NHSO2CH3] | bluish-tinged red |
| 4 | ![structure with H3C, CN, CN, N=N, N(C4H9)2, NHSO2CH3] | " |
| 5 | ![structure with CH3, CN, CN, N=N, N(C5H11)2, NHSO2CH3] | " |
| 6 | ![structure with CH3, CN, CN, N=N, N(C6H13)2, NHSO2CH3] | " |

-continued

| Example No. | Formula | Colour shade on polyester |
|---|---|---|
| 7 | CH₃—[ring: CN, CN]—N=N—[ring: NHSO₂CH₃]—N(C₈H₁₇)₂ | " |
| 8 | CH₃—[ring: CN, CN]—N=N—[ring: NHSO₂CH₃]—N(C₂H₄OC₄H₉)₂ | red |
| 9 | CH₃—[ring: CN, CN]—N=N—[ring: NHSO₂CH₃]—N(C₂H₄OC₃H₇)₂ | " |
| 10 | CH₃—[ring: CN, CN]—N=N—[ring: NHSO₂CH₃]—N(CH₂CH=CH₂)₂ | " |
| 11 | CH₃—[ring: CN, CN]—N=N—[ring: NHSO₂—C₆H₅]—N(C₂H₅)₂ | bluish-tinged red |
| 12 | CH₃—[ring: CN, CN]—N=N—[ring: NHSO₂—C₆H₅]—N(C₃H₇)₂ | " |
| 13 | CH₃—[ring: CN, CN]—N=N—[ring: NHSO₂—C₆H₄—CH₃]—N(C₃H₇)₂ | " |
| 14 | H₃C—[ring: CN, CN]—N=N—[ring: NHSO₂(CH₂)₄Cl]—N(C₂H₅)₂ | " |
| 15 | H₃C—[ring: CN, NO₂]—N=N—[ring: NHSO₂CH₃]—N(C₂H₅)₂ | red |
| 16 | H₃C—[ring: CN, NO₂]—N=N—[ring: NHSO₂CH₃]—N(C₃H₇)₂ | " |
| 17 | H₃C—[ring: CN, NO₂]—N=N—[ring: NHSO₂C₆H₅]—N(C₃H₇)₂ | " |

-continued

| Example No. | Formula | Colour shade on polyester |
|---|---|---|
| 18 | H₃C–⌬(CN)(NO₂)–N=N–⌬(NHSO₂C₆H₅)–N(C₂H₅)₂ | " |
| 19 | (CH₃)₃C–⌬(CN)(CN)–N=N–⌬(NHSO₂CH₃)–N(C₂H₅)₂ | bluish-tinged red |
| 20 | (CH₃)₃C–⌬(CN)(CN)–N=N–⌬(NHSO₂CH₃)–N(C₃H₇)₂ | " |
| 21 | ⟨H⟩–⌬(CN)(CN)–N=N–⌬(NHSO₂CH₃)–N(C₂H₅)₂ | " |
| 22 | CH₃(CH₂)₁₁–⌬(CN)(CN)–N=N–⌬(NHSO₂CH₃)–N(C₂H₅)₂ | " |
| 23 | CH₃(CH₂)₁₁–⌬(CN)(CN)–N=N–⌬(NHSO₂CH₃)–N(C₃H₇)₂ | " |
| 24 | CH₃, H₃C–⌬(CN)(CN)–N=N–⌬(NHSO₂CH₃)–N(C₂H₅)₂ | " |
| 25 | Br, H₃C–⌬(CN)(CN)–N=N–⌬(NHSO₂CH₃)–N(C₂H₅)₂ | ruby |
| 26 | Br–⌬(CN)(CN)–N=N–⌬(NHSO₂CH₃)–N(C₂H₅)₂ | " |
| 27 | Br–⌬(CN)(CN)–N=N–⌬(NHSO₂CH₃)–X  X = 50% N(C₂H₅)₂ / 50% N(C₃H₇)₂ | " |

| Example No. | Formula | Colour shade on polyester |
|---|---|---|
| 28 | Br—C₆H₂(CN)(CN)—N=N—C₆H₃(OCH₃)(NHSO₂CH₃)—N(C₂H₅)₂ | red-violet |
| 29 | Br—C₆H₂(Cl)(CN)—N=N—C₆H₃(NHSO₂CH₃)—N(C₂H₅)₂ | bluish-tinged red |
| 30 | Br—C₆H₂(Cl)(CN)—N=N—C₆H₃(NHSO₂CH₃)—N(C₃H₇)₂ | " |
| 31 | H₃CO—C₆H₂(CN)(CN)—N=N—C₆H₃(NHSO₂CH₃)—N(C₂H₅)₂ | " |
| 32 | H₃CO—C₆H₂(CN)(CN)—N=N—C₆H₃(NHSO₂CH₃)—X;  X = 50% N(C₂H₅)₂, 50% N(C₃H₇)₂ | " |
| 33 | H₃CO—C₆H₂(CN)(CN)—N=N—C₆H₃(NHSO₂CH₃)—N(C₃H₇)₂ | " |
| 34 | Cl—C₆H₂(CN)(CN)—N=N—C₆H₃(NHSO₂CH₃)—N(C₂H₅)₂ | ruby |
| 35 | C₆H₃(CN)(CN)—N=N—C₆H₃(NHSO₂CH₃)—N(C₂H₅)₂ | bluish-tinged red |
| 36 | H₃C—C₆H₂(CN)(CN)—N=N—C₆H₃(NHSO₂(CH₂)₁₄CH₃)—N(C₂H₅)₂ | " |
| 37 | H₃C—C₆H₂(CN)(CN)—N=N—C₆H₃(NHSO₂CH₃)—N(C₂H₄CN)(C₂H₅) | red |

-continued
| Example No. | Formula | Colour shade on polyester |
|---|---|---|
| 38 | 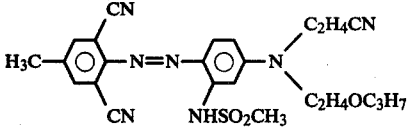 | " |
| 39 | 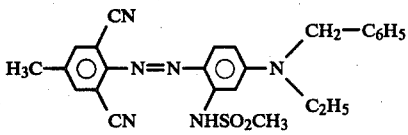 | bluish-tinged red |
| 40 | 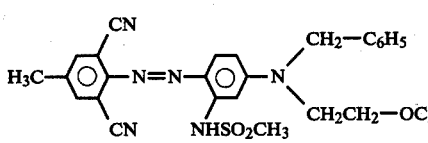 | " |
| 41 | 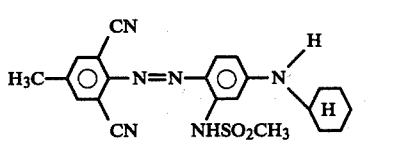 | " |
| 42 | 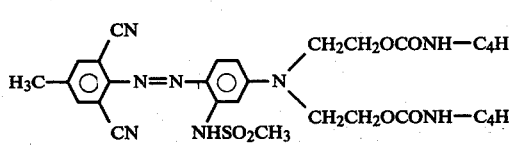 | red |
| 43 | 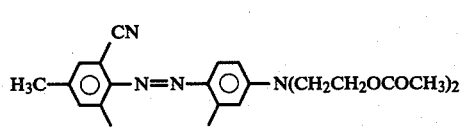 | " |
| 44 | 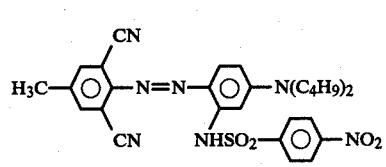 | bluish-tinged red |
| 45 | 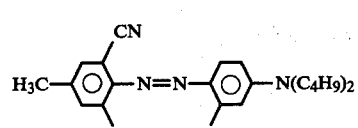 | " |
| 46 | 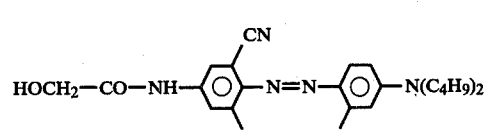 | ruby |
| 47 | 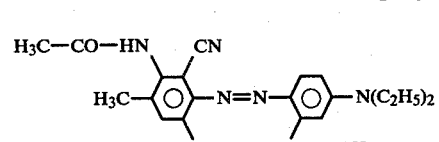 | bluish-tinged red |
| 48 | 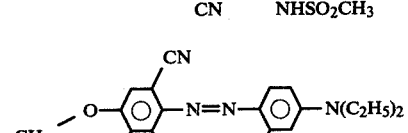 | " |

-continued

| Example No. | Formula | Colour shade on polyester |
|---|---|---|
| 49 | H₃C—⟨C₆H₂(CN)(CN)⟩—N=N—⟨C₆H₃(NHSO₂CH₂C₆H₅)⟩—N(C₂H₅)₂ | " |
| 50 | C₂H₅—⟨C₆H₂(CN)(CN)⟩—N=N—⟨C₆H₃(NHSO₂CH₃)⟩—N(H)(C₆H₅) | " |
| 51 | CH₃—⟨C₆H₂(CN)(CN)⟩—N=N—⟨C₆H₃(NHSO₂CH₃)⟩—N(CH₂CH₂CN)(CH₂—CH(OH)—CH₂—O—CH₃) | red |
| 52 | CH₃—⟨C₆H₂(CN)(CN)⟩—N=N—⟨C₆H₃(NHSO₂CH₃)⟩—N(CH₂CH₂OCH₂CH₂OCH₃)₂ | " |
| 53 | H₃C—⟨C₆H₂(CN)(CN)⟩—N=N—⟨C₆H₃(NHSO₂CH₃)⟩—N(CH₂CH₂CN)(CH₂CH₂(OC₂H₄)₃OCH₃) | " |
| 54 | H₃C—⟨C₆H₂(CN)(CN)⟩—N=N—⟨C₆H₃(NHSO₂CH₃)⟩—N(C₂H₅)(CH₂CH₂(OC₂H₄)₄OCOCH₃) | " |
| 55 | CH₃O(C₂H₄O)₃—⟨C₆H₂(CN)(CN)⟩—N=N—⟨C₆H₃(NHSO₂CH₃)⟩—N(C₂H₅)₂ | " |
| 56 | CH₃—⟨C₆H₂(CN)(CN)⟩—N=N—⟨C₆H₃(NHSO₂C₂H₅)⟩—N(C₂H₅)₂ | bluish-tinged red |
| 57 | CH₃—⟨C₆H₂(CN)(CN)⟩—N=N—⟨C₆H₃(NHSO₂CH₂CH₂CH₃)⟩—N(C₂H₅)₂ | " |
| 58 | CH₃—⟨C₆H₂(CN)(CN)⟩—N=N—⟨C₆H₃(NHSO₂CH₂CH₂CH₂CH₃)⟩—N(C₂H₅)₂ | " |
| 59 | CH₃—⟨C₆H(H₃C)(CN)(CN)⟩—N=N—⟨C₆H₃(NHSO₂(CH₂)₇CH₃)⟩—N(C₂H₅)₂ | " |

-continued

| Example No. | Formula | Colour shade on polyester |
|---|---|---|
| 60 | 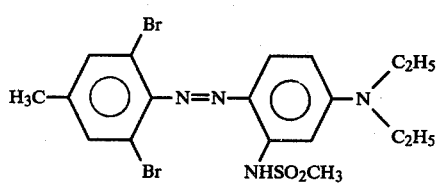 | " |

*These and the following longer-chain alkyl radicals in the dyestuff molecules are straight-chain radicals

EXAMPLE 61

Preparation of the dyestuff of the formula $$\text{H}_3\text{C}-\underset{\underset{\text{Br}}{|}}{\overset{\overset{\text{Br}}{|}}{\bigcirc}}-\text{N}=\text{N}-\underset{\underset{\text{NHSO}_2\text{CH}_3}{|}}{\bigcirc}-\text{N}\underset{\text{C}_2\text{H}_5}{\overset{\text{C}_2\text{H}_5}{<}}$$

A solution of 26.5 g of 2,6-dibromo-4-methyl-aniline in 125 ml of 60% strength sulphuric acid is diazotised with 17 ml of a 42% strength nitrosylsulphuric acid at 38°–40° C. The mixture is subsequently stirred for 60 minutes at 40°, and the solution of the diazo component is then added, at 0°–5° C., to a solution or suspension of 24.2 g of 3-diethylamino-methanesulphonanilide and 2 g of amidosulphonic acid in 200 ml of water. The pH value is increased to 3 by adding sodium acetate. The product is filtered off, and washed several times with water.

Yield: 45.5 g

The dyestuff dyes polyester fibres in an orange shade with good general fastness properties, in particular fastness to light, sublimation and wet processing.

The dyestuffs indicated in the Table which follows are obtained by an analogous or similar procedure.

| Example No. | Formula | Colour shades on polyester |
|---|---|---|
| 62 | CH$_3$—[2,6-Cl$_2$-C$_6$H$_2$]—N=N—[3-NHSO$_2$CH$_3$-C$_6$H$_3$]—N(C$_3$H$_7$)$_2$ | orange |
| 63 | H$_3$C—[2,6-Br$_2$-C$_6$H$_2$]—N=N—[3-NHSO$_2$CH$_3$-C$_6$H$_3$]—N(C$_4$H$_9$)$_2$ | orange |
| 64 | CH$_3$—[2,6-Br$_2$-C$_6$H$_2$]—N=N—[3-NHSO$_2$CH$_3$-C$_6$H$_3$]—N(C$_2$H$_4$OC$_4$H$_9$)$_2$ | orange |
| 65 | CH$_3$—[2,6-Cl$_2$-C$_6$H$_2$]—N=N—[3-NHSO$_2$CH$_3$-C$_6$H$_3$]—N(C$_2$H$_4$OC$_3$H$_7$)$_2$ | orange |
| 66 | CH$_3$—[2,6-Br$_2$-C$_6$H$_2$]—N=N—[3-NHSO$_2$CH$_3$-C$_6$H$_3$]—N(CH$_2$CH=CH$_2$)$_2$ | orange |
| 67 | 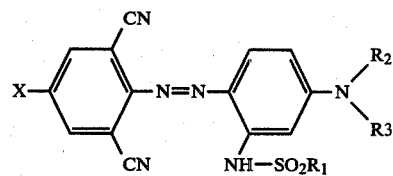 | bluish-tinged red |

I claim:

1. In the coloring of fibrous materials red by dyeing or printing with a dispersion of a dyestuff, the improvement wherein said dyestuff comprises a red-dyeing azo compound of the formula $$X-\underset{\underset{\text{CN}}{|}}{\overset{\overset{\text{CN}}{|}}{\bigcirc}}-\text{N}=\text{N}-\underset{\underset{\text{NH}-\text{SO}_2\text{R}_1}{|}}{\bigcirc}-\text{N}\underset{\text{R}_3}{\overset{\text{R}_2}{<}}$$

in which
X is $C_1$–$C_4$-alkyl, $C_1$–$C_4$-alkoxy, $CH_3(OCH_2CH_2)_mO$, chlorine, bromine or hydrogen,
m is 1–4,
$R_1$ is $C_1$–$C_4$-alkyl, benzyl, phenyl or tolyl,
$R_2$ is hydrogen, $C_1$–$C_4$-alkyl, $C_1$–$C_4$-alkyl substituted by $C_1$–$C_4$-alkoxy, $C_2H_4OCONHC_4H_9$, $C_2H_4OCOCH_3$ or $C_2H_4OC_2H_4OCH_3$, and
$R_3$ is benzyl, phenethyl, $C_1$–$C_4$-alkyl, $C_1$–$C_4$-alkyl substituted by $C_1$–$C_4$-alkoxy, $C_2H_4OCOHNC_4H_9$, $C_2H_4OCOCH_3$ or $C_2H_4OC_2H_4OCH_3$.

2. The process according to claim 1, wherein X is hydrogen, chlorine, $C_1$–$C_4$-alkyl or $C_1$–$C_4$-alkoxy,
$R_1$ is $C_1$–$C_4$-alkyl or phenyl.

3. The process according to claim 2, in which $R_1$ is methyl.

4. The process according to claim 2, wherein said dyestuff is of the formula

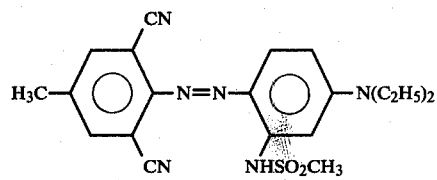

5. Fibrous material dyed or printed red by the process of claim 1.

* * * * *